United States Patent
Czabala et al.

(12) 
(10) Patent No.: US 6,190,441 B1
(45) Date of Patent: Feb. 20, 2001

(54) PRESSURE SWING ABSORPTION SYSTEM WITH MULTI-CHAMBER CANISTER

(75) Inventors: Michael P. Czabala, Roswell; Robert W. Murdoch, Woodstock, both of GA (US)

(73) Assignee: Respironics Georgia, Inc., Marietta, GA (US)

( * ) Notice: Under 35 U.S.C. 154(b), the term of this patent shall be extended for 0 days.

(21) Appl. No.: 09/455,832

(22) Filed: Dec. 6, 1999

Related U.S. Application Data

(63) Continuation of application No. 09/017,109, filed on Jan. 30, 1998, now Pat. No. 5,997,617.
(60) Provisional application No. 60/036,835, filed on Jan. 31, 1997.

(51) Int. Cl.$^7$ .................................................. B01D 53/053
(52) U.S. Cl. ................. 96/130; 96/133; 96/144
(58) Field of Search .................. 95/96–105, 130, 95/138; 96/108, 109, 113–115, 126–130, 133, 143, 144, 146

(56) References Cited

U.S. PATENT DOCUMENTS

| | | |
|---|---|---|
| 928,978 | 7/1909 | Jaubert ........................... 96/133 X |
| 1,593,137 | 7/1926 | O'Rourke et al. .................... 96/131 |
| 2,101,555 | 12/1937 | Moore et al. . |
| 2,665,816 | 1/1954 | Anft ...................................... 220/20 |
| 3,186,148 | 6/1965 | Merrill et al. ...................... 96/131 |
| 3,258,899 | 7/1966 | Coffin ................................. 55/162 |
| 3,323,288 | 6/1967 | Cheung et al. ....................... 55/58 |
| 3,324,631 | 6/1967 | Kreuter ................................. 55/163 |
| 3,849,089 | 11/1974 | Ritter et al. .......................... 55/33 |
| 4,065,272 | 12/1977 | Armond ........................... 95/130 X |
| 4,302,224 | 11/1981 | McCombs et al. ................. 55/160 |
| 4,428,372 | 1/1984 | Beysel et al. ................ 128/202.26 |
| 4,496,376 | 1/1985 | Hradek ............................... 55/163 |
| 4,559,065 | 12/1985 | Null et al. ........................... 55/161 |
| 4,576,616 | 3/1986 | Mottram et al. ..................... 55/68 |
| 4,584,001 | 4/1986 | Dechene ............................. 55/162 |
| 4,631,073 | 12/1986 | Null et al. ............................. 55/18 |
| 4,802,899 | 2/1989 | Vrana et al. ........................ 55/161 |
| 4,822,384 | 4/1989 | Kato et al. .......................... 55/158 |
| 4,826,510 | 5/1989 | McCombs ........................... 55/179 |
| 4,892,566 | 1/1990 | Bansal et al. ........................ 55/26 |
| 4,894,072 | 1/1990 | Turner et al. ....................... 55/179 |
| 4,925,464 | 5/1990 | Rabenau et al. ................... 55/179 |
| 4,932,546 | 6/1990 | Stannard ............................. 220/3 |
| 4,973,339 | 11/1990 | Bansal ................................. 55/31 |
| 5,112,367 | 5/1992 | HILL .................................... 55/26 |
| 5,114,441 | 5/1992 | Kanner et al. ................. 95/130 X |
| 5,183,483 | 2/1993 | Servidio et al. ..................... 55/26 |

(List continued on next page.)

FOREIGN PATENT DOCUMENTS

| | | | |
|---|---|---|---|
| 288 531 | 4/1991 | (DE) . | |
| 2550 466 | 2/1985 | (FR) | .................................... 96/133 |
| 2550466 | 7/1985 | (FR) | .................................... 96/133 |
| 425612 | 3/1935 | (GB) . | |
| 2232364 | 12/1990 | (GB) | .................................... 96/133 |
| 1-067221 | 3/1989 | (JP) | .................................... 96/133 |
| 1-245827 | 10/1989 | (JP) | .................................... 96/133 |
| 4-122411 | 4/1992 | (JP) . | |

Primary Examiner—Robert H. Spitzer
(74) Attorney, Agent, or Firm—Michael W. Haas

(57) ABSTRACT

A multi-chamber canister for a pressure swing absorption system within a general housing assembly. The chambers include a first molecular sieve chamber for receiving a first molecular sieve for separating air from the ambient environment into a concentrated gas and at least a second molecular sieve chamber disposed within the housing assembly for receiving a second molecular sieve for separating air from the ambient environment into a concentrated gas component. Furthermore, a supply chamber is disposed within the housing for receiving air from the ambient environment and for communicating air to either first or second molecular sieve chambers.

11 Claims, 4 Drawing Sheets

U.S. PATENT DOCUMENTS

| | | | |
|---|---|---|---|
| 5,268,021 | 12/1993 | Hill et al. | 95/98 |
| 5,474,595 | 12/1995 | McCombs | 95/23 |
| 5,531,807 | 7/1996 | McCombs | 95/26 |
| 5,549,736 | 8/1996 | Coffield et al. | 96/133 |
| 5,578,115 | 11/1996 | Cole | 96/121 |
| 5,593,480 | 1/1997 | Pöschl | 96/133 X |
| 5,827,354 | 10/1998 | Krabiell et al. | 96/133 X |
| 5,997,617 * | 12/1999 | Czabala et al. | 96/130 |

* cited by examiner

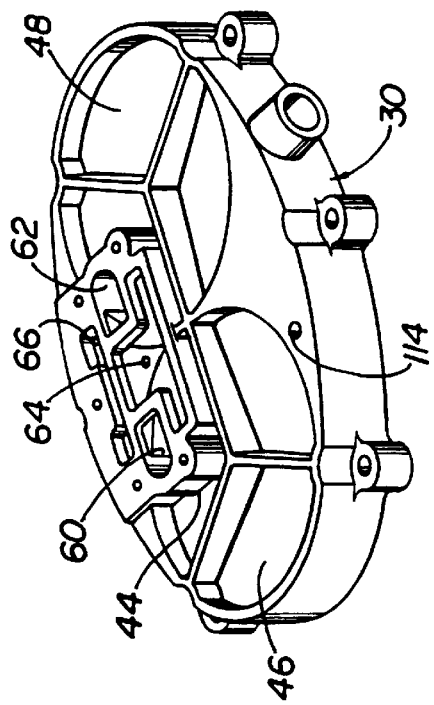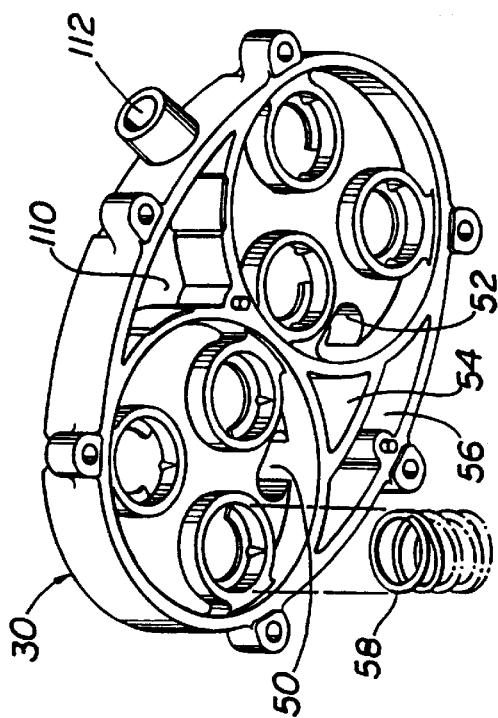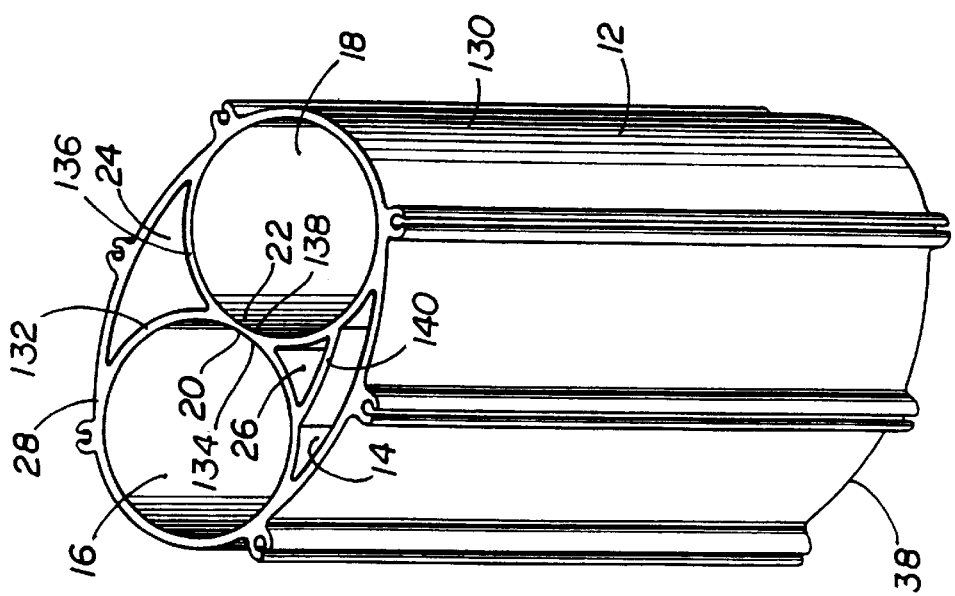

PRESSURE SWING ABSORPTION SYSTEM WITH MULTI-CHAMBER CANISTER

This is a Continuation of U.S. patent application Ser. No. 09/017,109 filed Jan. 30, 1998, now U.S. Pat. No. 5,997,617, which claims priority from U.S. provisional application No. 60/036,835 filed Jan. 31, 1997.

This invention relates to a pressure swing absorption chamber, and more particularly to an oxygen concentrator system having a multi-chamber canister for receiving compressed air from a compressor and directing the air through a series of chambers integral within a single assembly for producing concentrated oxygen in a pressure swing absorption system.

BACKGROUND OF THE INVENTION

Pressure swing absorption systems are used for separating a desired gas from a gas mixture such as air. A typical pressure swing absorption system is an oxygen concentrator which separates the oxygen from air for subsequent inhalation by a patient. An oxygen concentrator, or similar pressure swing absorption system, typically includes a plurality of molecular sieve beds for separating the gas into an oxygen and a nitrogen fraction whereby the oxygen is subsequently provided to a patient while the nitrogen is retained in the sieve bed and subsequently purged. Typically, oxygen concentrators include several components such as an air compressor, two three-way air valves, multiple canisters each housing a separate molecular sieve and a product reservoir tank. Such structures require extensive valving and plumbing which effects the efficiency and costs of these systems.

U.S. Pat. No. 5,578,115 discloses a container for a pressure swing oxygen concentrator for housing a plurality of molecular sieves. An extrusion is cut to a desired length and end caps are secured to the extrusion with screws and resilient seals. A third cavity serves as an accumulator for receiving and storing concentrated oxygen. While such structure is sufficient for its intended purpose, a more improved design may be had for incorporating the operations of an oxygen concentrator within a single housing configuration.

Accordingly, it is an object of the present invention to provide a pressure swing absorption system incorporating a multi-chamber canister assembly for improving the efficiency of the system;

Furthermore, it is an object of the present invention to provide a pressure swing absorption system incorporating a multi-chamber canister assembly for improving the cost of the system;

It is also an object of the present invention to provide a multi-chamber canister assembly for a pressure swing absorption system wherein the temperature difference between molecular sieves is minimal due to their location within the canister;

Also, it is an object of the present invention to provide a multi-chamber canister assembly for a pressure swing absorption system wherein multiple operations of the pressure swing absorption system may be incorporated within a single housing assembly.

SUMMARY OF THE INVENTION

The above objectives are accomplished according to the invention by providing a multi-chamber canister for a pressure swing absorption system which includes at least three chambers. The canister includes a housing of a general length. A first molecular sieve chamber is disposed within the housing for receiving a first molecular sieve for separating air from the ambient environment into a concentrated gas component. At least a second molecular sieve-chamber is also disposed within the housing for receiving a second molecular sieve for separating air from the ambient environment into a concentrated gas component. A supply chamber is disposed within the housing for receiving air from the ambient environment and for communicating the air to either the first or second molecular sieve chamber.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 3 is a perspective view of a multi-chamber canister for use in a pressure swing absorption system according to the present invention;

FIG. 4a is a perspective view of a top cover for communicating fluid flow within a multi-chamber canister for use in a pressure swing absorption system according to the present invention;

FIG. 4b is a perspective view of a top cover for communicating fluid flow within a multi-chamber canister for use in a pressure swing absorption system according to the present invention;

DESCRIPTION OF THE PREFERRED EMBODIMENT

Figure 1:
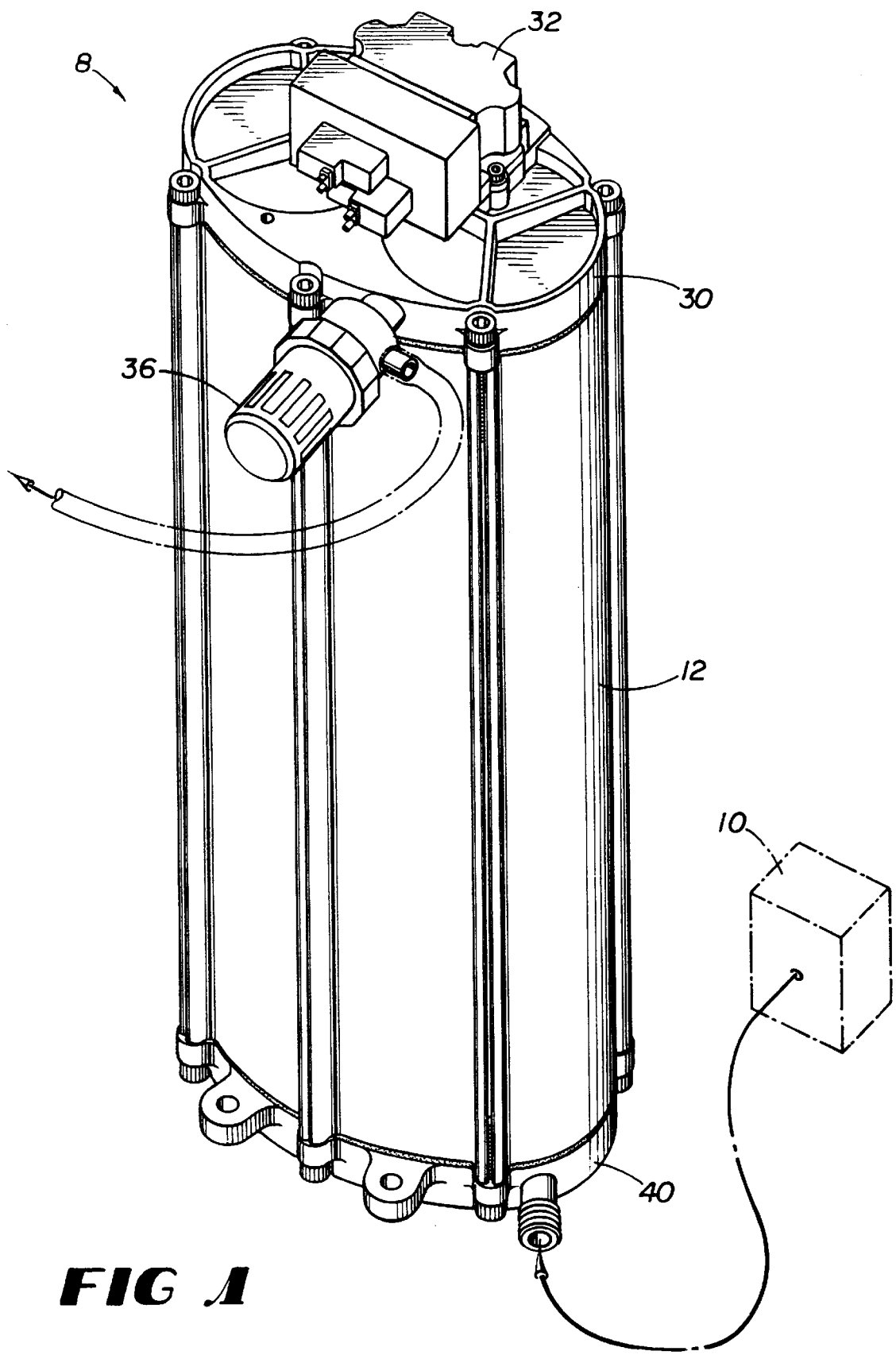
FIG. 1 is a perspective view of a pressure swing absorption system according to the present invention.

As shown in FIGS. 1 and 3, pressure swing absorption system 8 includes compressor 10 having an inlet for receiving air from the ambient environment. Compressor 10 compresses the air and provides the pressurized air to multi-chamber canister 12. In the preferred embodiment, pressure swing absorption system 8 fractionalizes oxygen from the air in an oxygen concentration system. The operation of an oxygen concentration system is described in U.S. Pat. No. 5,183,483 entitled "Pneumatic Circuit Control for Pressure Swing Adsorption Systems" which is incorporated by reference.

Multi-chamber canister 12 includes multiple chambers for producing concentrated oxygen from pressurized air. Canister 12 is preferably a cylindrical elongated housing providing sufficient volume for the respective chambers. In the preferred embodiment, canister 12 is a single extrusion, but may consist of separate housings interconnected for forming a canister assembly. Supply chamber 14 receives the pressurized air from the compressor for delivery to the molecular sieves. First molecular sieve chamber 16 is located adjacent to second molecular sieve chamber 18 which house zeolite or other suitable material for fractionating air into oxygen and a waste product gas such as nitrogen. First molecular sieve chamber 16 and second molecular sieve chamber 18 have abutting walls 20 and 22 to maintain a constant temperature between the chambers which reduces the swing in oxygen concentration between the two chambers. Product chamber 24 is in fluid communication with both first molecular sieve chamber 16 and second molecular sieve chamber 18 for receiving and storing concentrated oxygen produced by the respective sieves. Exhaust chamber 26 is in fluid communication with both first and second molecular sieve chambers 16 and 18 and receives the waste product gas which has been purged from a respective molecular sieve. Each of these chambers extend along the length of multi-chamber canister 12.

As shown in FIG. 3, multi-chamber canister 12 is preferably designed as a single extruded unit having a single canister housing wall 130 with all of the respective chambers defined within housing wall 130. First molecular sieve chamber 16 is defined by first molecular sieve chamber partition 132 interfacing with canister housing wall 130. First molecular sieve chamber partition 132 has a first end and a second end which interface with canister wall 130. An intermediary portion 134 of first molecular sieve chamber partition 132 is offset from canister wall 130 to assist in defining first molecular sieve chamber 16. Like first molecular sieve chamber 16, second molecular sieve chamber 18 is defined by second molecular sieve chamber partition 136 interfacing with canister housing wall 130. Second molecular sieve chamber partition 136 has a first end and a second end which interface with canister wall 130. An intermediary portion 138 of second molecular sieve chamber partition 136 is offset from canister wall 130 to assist in defining second molecular sieve chamber 18. In the preferred embodiment, intermediary portions 134 and 138 respectively abut each other to maintain a consistent temperature between the two molecular sieve beds.

As further shown in FIG. 3, supply chamber 14 is defined within multi-chamber canister 12 by supply chamber partition 140 being offset from canister housing wall 130. Exhaust chamber 26 may be defined by its own exhaust chamber partition, or as shown in FIG. 3 as one embodiment, defined by the offsets of first and second molecular sieve partitions 132 and 136 in combination with the offset of supply chamber partition 140. Likewise, product chamber 24 may be defined by its own product chamber partition being offset from canister housing wall 130, or as one embodiment, defined by the offsets of first and second molecular sieve partitions 132 and 136 in combination with an offset with canister housing wall 130. Each of the respective partitions extend along the length of multi-chamber canister 12. It is understood that several chamber configurations may be had within the housing and that a particular chamber may be defined either by its own particular partition or as an offset between two other partitions.

Figure 2:
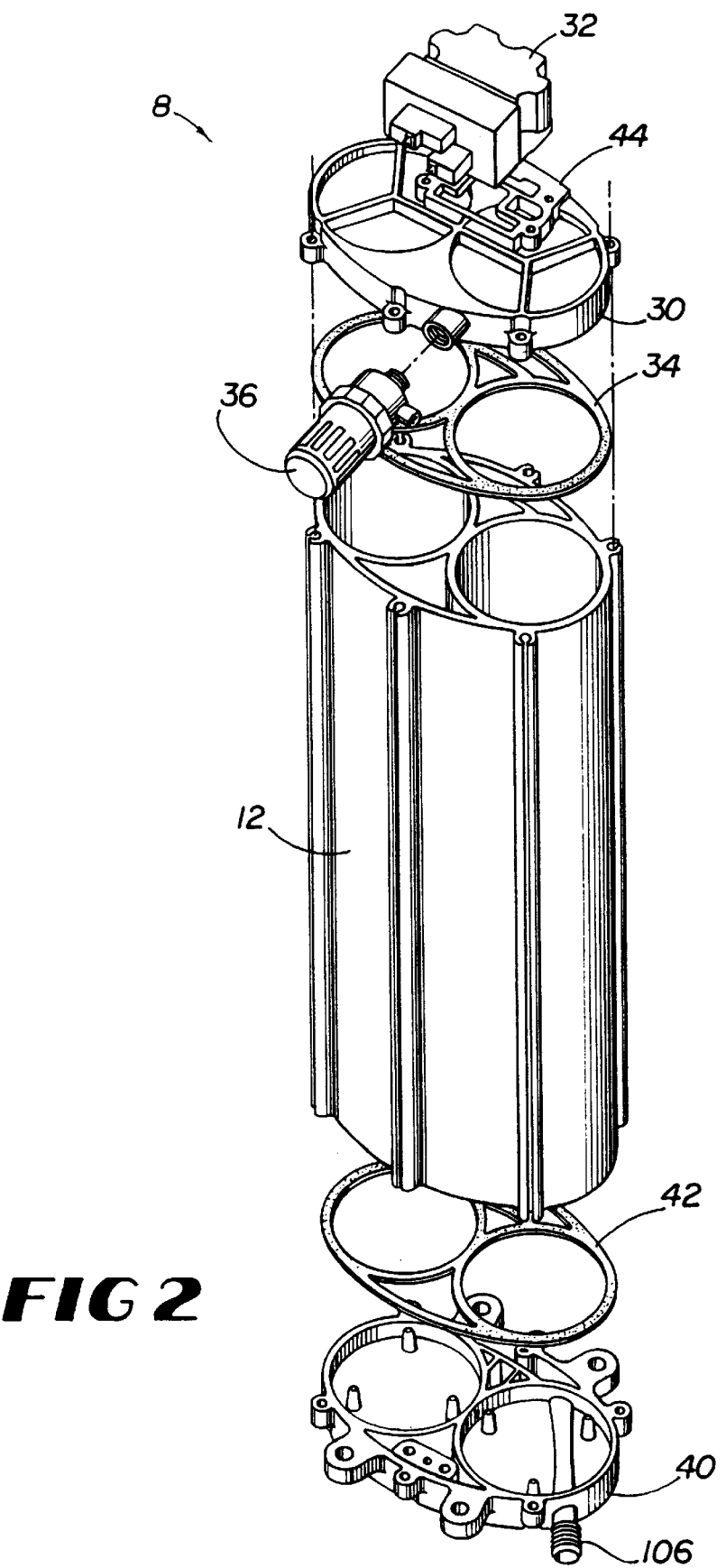
FIG. 2 is an exploded view of a pressure swing absorption system according to the present invention.

An exploded view of the multi-chamber canister assembly is shown in FIG. 2. Top portion 28 of multi-chamber canister 12 carries a top cover 30. Top cover 30 encloses the top portion of the respective chambers of multi-chamber canister 12 and includes a plurality of orifices enabling fluid flow between the respective chambers which will be described in more detail hereinafter. Valve 32 directs the communication of fluid flow between the orifices of top cover 30 and the respective chambers of multi-chamber canister 12. Top cover seal 34 seals the connection between top cover 30 and multi-chamber canister 12. Pressure regulator 36 regulates the pressure of concentrated oxygen delivered from product chamber 24 to a patient. The bottom portion 38 of multi-chamber canister 12 carries bottom cover 40. Bottom cover 40 encloses the bottom of the respective chambers of multi-chamber canister 12 and provides for fluid communication between the respective chambers as will be described in more detail hereinafter. Bottom cover seal 42 seals the connection between bottom cover 40 and multi-chamber canister 12.

Top cover 30 is shown in more detail in FIGS. 4a and 4b and includes valve seat 44. Top cover 30 includes first molecular sieve cover plenum 46 and second molecular sieve cover plenum 48. Disposed within first molecular sieve cover plenum 46 at a point which aligns with valve seat 44 is first molecular sieve inlet port 50 which will provide fluid communication with first molecular sieve 16. Disposed within second molecular sieve cover plenum 48 at a point which aligns with valve seat 44 is second molecular sieve inlet port 52 which will provide fluid communication with second molecular sieve 18. Top cover 30 also includes exhaust port 54 which communicates with exhaust chamber 26 to permit venting of waste product gas from the system. Furthermore, disposed within top cover 30 is supply port 56 which communicates with supply chamber 14. Springs 58 are carried by top cover 30 for maintaining the molecular sieve zeolite material in place within the respective molecular sieve chambers.

Valve seat 44 includes various ports which correspond with the aforementioned ports of top cover 30 for communicating fluid flow throughout the pressure swing absorption cycle. Valve seat first molecular sieve port 60 communicates with first molecular sieve port 50, valve seat second molecular sieve port 62 communicates with second molecular sieve port 52, valve seat exhaust port 64 communicates with exhaust port 54 and valve seat supply port 66 communicates with supply port 56. Valve 32 is carried by valve seat 44 for directing fluid flow between the respective ports during operation of the pressure swing absorption system.

Figure 5:
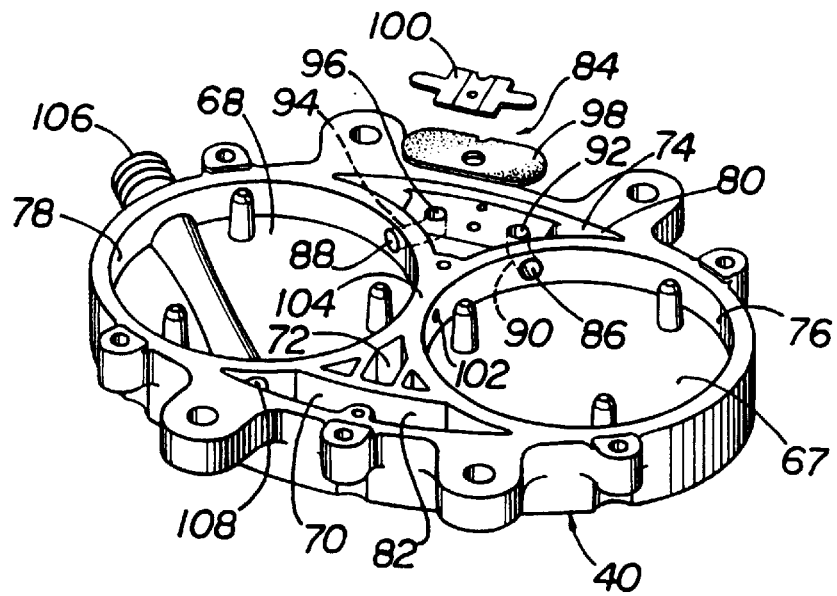
FIG. 5 is a perspective view of a bottom cover for communicating fluid flow within a multi-chamber canister for use in a pressure swing absorption system according to the present invention.

FIG. 5 illustrates bottom cover 40 which controls flow between the respective molecular sieves 16 and 18 during the purging cycle and also controls the delivery of product gas from the respective molecular sieves to product chamber 24. Bottom cover 40 includes first molecular sieve bottom cover plenum 67, second molecular sieve bottom cover plenum 68, supply chamber bottom plenum 70, exhaust chamber outlet port 72, and product tank bottom plenum 74. Bottom cover 40 includes cavities such that the respective chambers are defined by multi-chamber canister 12 in combination with bottom cover 40. For example, bottom cover 40 includes first molecular sieve chamber bottom wall 76, second molecular sieve chamber bottom wall 78, product tank bottom wall 80 and supply chamber bottom wall 82. The combination of the bottom walls and plenums enclose the respective chambers of multi-chamber canister 12.

The delivery of product gas to product chamber 24 from the respective molecular sieves is controlled in part by delivery system 84. Delivery system 84 includes first gas outlet port 86 defined within first molecular sieve chamber bottom wall 76 and second gas outlet port 88 defined within second molecular sieve chamber bottom wall 78. First gas outlet port 86 communicates with first delivery channel 90 and terminates at first internal gas outlet port 92 which is located within product chamber 24 for delivering concentrated oxygen from first molecular sieve chamber 16 to product chamber 24. Second gas outlet port 88 communicates with second delivery channel 94 and terminates at second internal outlet port 96 for delivering concentrated oxygen from second molecular sieve chamber 18 to product chamber 24. Dual check valve 98 overlies both first and second internal gas outlet ports 92 and 96. Both first and second internal gas outlet ports 92 and 96 will communicate with product chamber 24 when open. In the preferred embodiment, first and second internal gas outlet ports 92 and 96 and dual check valve 98 are located within supply chamber 24. Check valve retainer 100 maintains pressure on dual check valve 98 to close off first and second internal gas outlet ports 92 and 96 preventing a backflow of product gas to a respective molecular sieve chamber ensuring that the product gas is delivered to product chamber 24.

During the purging cycle of each molecular sieve, purge control orifice 102 communicates pressurized gas from a molecular sieve which is undergoing a charging cycle to the other molecular sieve. Purge control orifice 102 extends through the abutting walls of first and second molecular sieve chambers 16 and 18. In the preferred embodiment, multi-chamber canister 12 is a single extrusion such that first and second molecular sieve chambers 16 and 18 share common wall 104, however, multi-chamber canister 12 may be comprised of an assembly of separate chambers integrated to form a multi-chamber assembly. In this situation, common wall 104 will consist of separate molecular sieve chamber walls which abut. This design assists in maintaining an even temperature between the molecular sieves which enables the concentration of oxygen produced by each respective sieve to be approximately equal in concentration level.

Compressed air inlet 106 receives compressed air from a compressor and communicates the gas to supply chamber 14 through supply port 108 bypassing second molecular sieve chamber 18. As shown in FIG. 1 since the compressed air is received at the bottom of multi-chamber canister assembly 12, the compressed air must travel along the length of the canister to reach valve 32 for subsequent presentation to either first or second molecular sieve chambers 16 or 18. By requiring the compressed air to travel along the length of canister 12, the external wall of canister 12 functions as a heat exchanger for cooling the compressed air. Generally, air after compression is at a higher temperature than ambient. The effectiveness of the molecular sieves is increased with air at a cooler temperature. Accordingly, the cooling of the compressed air prior to entry into the molecular sieves enhances the efficiency of the pressure swing absorption system.

As shown in FIG. 4b, top cover 30 includes supply chamber top cavity 110 which encloses the top portion of supply chamber 24 of multi-chamber canister 12. Product supply port 112 communicates the concentrated gas to a patient through pressure regulator 36. Product chamber pressure sensor tap 114 (FIG. 4a) enables the mounting of a pressure sensor for determining the pressure within product chamber 24.

Figure 6:
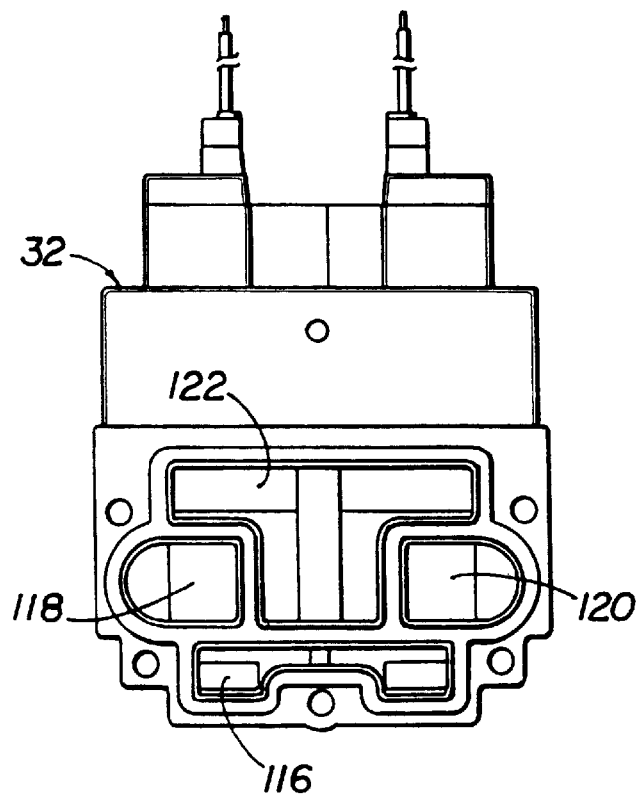
FIG. 6 is a perspective view of a valving system for communicating fluid flow within a multi-chamber canister for use in a pressure swing absorption system according to the present invention.

FIG. 6 illustrates valve 32. Valve 32 is carried by valve seat 44 for communicating the flow of fluid throughout the pressure swing absorption cycle. Valve inlet port 116 opens and closes for communicating compressed air from supply chamber 14 to molecular sieve chambers 16 and 18. First molecular sieve valve outlet 118 and second molecular sieve valve outlet 120 open and close to permit compressed air to enter the respective molecular sieves during operation of the pressure swing absorption cycle. Valve exhaust outlet 122 communicates with exhaust chamber 26 permitting purged gas to exit the respective molecular sieves and enter exhaust chamber 26 for venting through exhaust port 72. Valve 32 is controlled by a microprocessor and solenoids, not shown, for directing communication of fluid throughout the system.

When assembled as shown in FIG. 1, top and bottom covers 30 and 40 in combination with multi-chamber canister 12 define a fully integrated system wherein a supply chamber, product chamber, exhaust chamber and first and second molecular sieve chambers are enclosed within a general profile defined by multi-chamber canister 12. As previously mentioned, multi-chamber canister may be a single extrusion or a plurality of extrusions wherein the chambers are configured to be enclosed within separate extrusions and wherein the plurality of extrusions are assembled to define a configuration similar to that shown in FIG. 1.

In operation, air enters compressor 10 and is compressed resulting in the compressed air having a temperature higher than the ambient air. The compressed air enters multi-chamber canister 12 through bottom cover 40 and is presented to supply chamber 14. The compressed air is passed through supply chamber 14 to valve 32 for delivery to a respective molecular sieve chamber 16 or 18. Since valve 32 is located on opposite ends of multi-chamber canister 12, the compressed air travels along the length of multi-chamber canister 12 enabling multi-chamber canister 12 to act as a heat exchanger for cooling the compressed air prior to delivery to a respective molecular sieve. Valve 32 opens a respective molecular sieve chamber enabling the compressed air to enter the molecular sieve chamber. The molecular sieve material filters the nitrogen molecules from the air producing a concentration of oxygen. The concentrated oxygen in turn pressurizes a respective outlet port 86 or 88 which forces check valve retainer 100 to bend, opening up dual check valve 98 enabling the concentrated oxygen to enter product chamber 24, while simultaneously maintaining the other respective outlet port closed preventing a backflow of concentrated oxygen to flow into the other respective molecular sieve. The concentrated oxygen passes along the length of multi-chamber canister and exists through pressure regulator 36. Once again, the passage of the concentrated oxygen along the length of multi-chamber canister 12 enables multi-chamber canister 12 to act as a heat exchanger for cooling the concentrated oxygen prior to delivery to a patient.

Approximately one third of the concentrated oxygen enters product chamber 24 allowing the remaining two thirds to enter the other molecular sieve chamber through purge control orifice 102. Valve 32 simultaneously opens exhaust port 54 enabling nitrogen to be purged from the respective molecular sieve chamber and pass through exhaust port 54 in top cover 30 and enter into exhaust chamber 26 for subsequent venting at exhaust chamber outlet port 72 located in bottom cover 40. The cycle of charging and purging of the molecular sieves is further detailed in U.S. Pat. No. 5,183,483.

Thus, accordingly, a more improved design for a pressure swing absorption system may be had with a multi-chamber canister enclosing within a single profile a plurality of chambers utilized throughout the pressure swing absorption system. By locating the components of a pressure swing absorption system within a single multi-chamber canister, even temperature may be maintained throughout the system ensuring an improved consistency in the concentration of oxygen as well as eliminating pressure drops which invariably result from valving and tubing commonly found in oxygen concentration systems with separate components.

What is claimed is:

1. A sieve bed assembly for separating air from the ambient environment into a concentrated gas component, the system comprising:

a first housing component having a first sieve chamber defined therein, the first sieve chamber being adapted to contain a material for separating air from the ambient environment into a concentrated gas component;

a second housing component having a second sieve chamber defined therein, the second sieve chamber being adapted to contain a material for separating air from the ambient environment into a concentrated gas component; and a supply housing component having a supply chamber defined therein for receiving air from the ambient environment and for communicating the air to the first and the second sieve chambers, wherein the supply housing component is thermally coupled to at least one of the first housing component and the second housing component, and wherein the supply chamber includes an air inlet for receiving air that is disposed a distance apart from where the supply chamber fluidly communicates with either one of the first and the second sieve chambers enabling the supply housing component and at least one of an associated first or second housing component to act as a heat exchanger for cooling the air received at the air inlet.

2. The sieve bed assembly of claim 1, further comprising an exhaust housing component having an exhaust chamber defined therein, wherein the exhaust chamber is in fluid communication with the first and the second sieve chambers for exhausting waste product gas produced from the sieve material contained within each respective first and second sieve chamber.

3. The sieve bed assembly of claim 2, further comprising a bottom cover enclosing the first sieve chamber, the second sieve chamber, and the exhaust chamber, and wherein the bottom cover defines an exhaust outlet in fluid communication with the exhaust chamber for venting waste product gas received from the first and the second sieve chambers to the ambient environment.

4. The sieve bed assembly of claim 1, wherein the first and the second housing components are thermally coupled to one another for maintaining ah approximately even temperature within the first and the second sieve chambers.

5. The sieve bed assembly of claim 1, further comprising a purge control orifice defined in a wall of the first and the second housing components enabling gas from one of the first and the second sieve chambers to flow to a remaining other of the first and the second sieve chambers to assist in purging waste product gas from one of the first and the second sieve chamber receiving the gas.

6. The sieve bed assembly of claim 1, further comprising a bottom cover enclosing the first and the second sieve chambers.

7. The sieve bed assembly of claim 6, wherein the bottom cover includes a cavity defining a receptacle for the supply chamber to receive air.

8. The sieve bed assembly of claim 1, further comprising a product housing component having a product chamber defined therein, the product chamber being adapted to receive a concentrated gas component from either of the first and the second sieve chambers for subsequent delivery to a patient.

9. The sieve bed assembly of claim 8, further comprising a bottom cover enclosing the first sieve chamber, the second sieve chamber, and the product chamber, and wherein the bottom cover includes a first concentrated gas outlet port for communicating concentrated gas from the first sieve chamber to the product chamber.

10. The sieve bed assembly of claim 9, wherein the bottom cover includes a second concentrated gas outlet port for communicating concentrated gas from the second sieve chamber to the product chamber.

11. The sieve bed assembly of claim 8, further comprising:

(1) a top cover enclosing the first sieve chamber, the second sieve chambers, the supply chamber, and the product chamber, wherein the top cover includes a first sieve port, a second sieve port, and a supply chamber port enabling fluid communication between the supply chamber and the first and the second sieve chambers;

(2) a valve for controlling a fluid communication of gas between the supply chamber and the first and the second molecular sieve chambers, the top cover including a valve seat for carrying the valve, the valve seat including:

(a) a valve seat supply chamber port in fluid communication with the top cover supply chamber port, (b) a valve seat first sieve port in fluid communication with the top cover first sieve port, (c) a valve seat second sieve port in fluid communication with the top cover second sieve port for enabling the valve to communicate fluid between the supply chamber and the first and second molecular sieve chambers.

* * * * *